Feb. 25, 1936.  S. EINSTEIN ET AL  2,032,269

GRINDING MACHINE

Original Filed June 28, 1929   11 Sheets-Sheet 1

Inventors
SOL EINSTEIN
CLEMENT BOOTH
FREDERICK S. HAAS

By AHH Parsons

Feb. 25, 1936.                    S. EINSTEIN ET AL                    2,032,269
                                  GRINDING MACHINE
                    Original Filed June 28, 1929    11 Sheets-Sheet 2
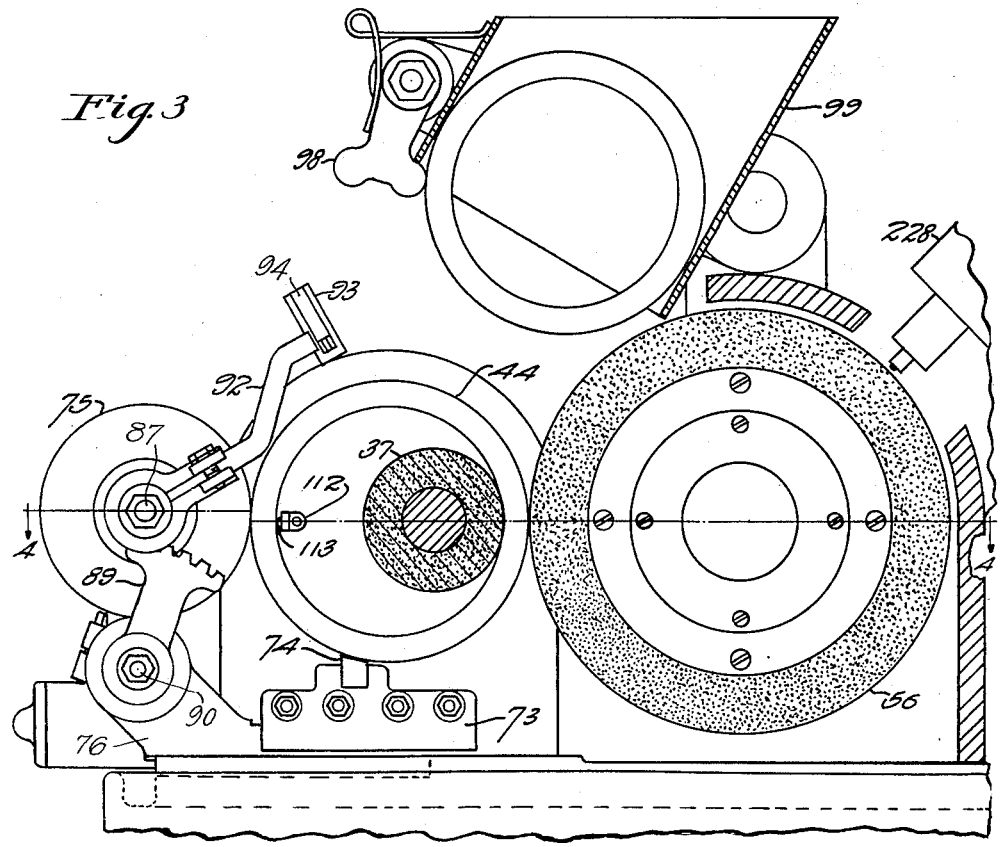
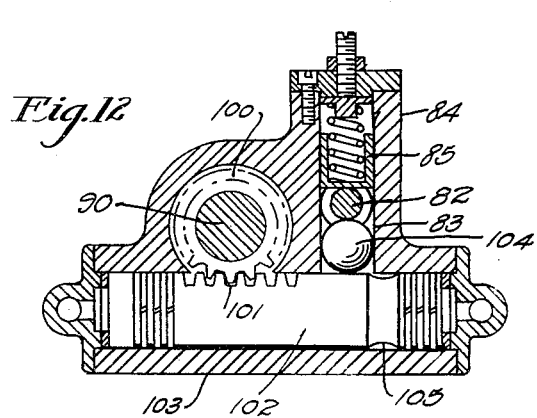
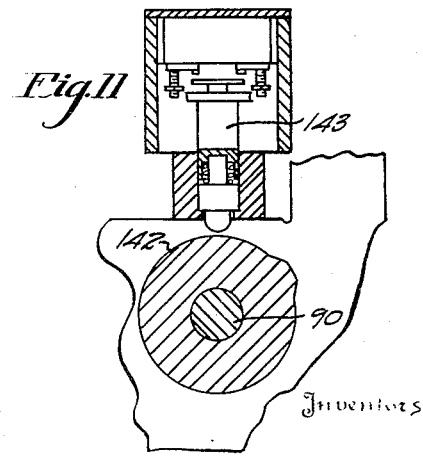

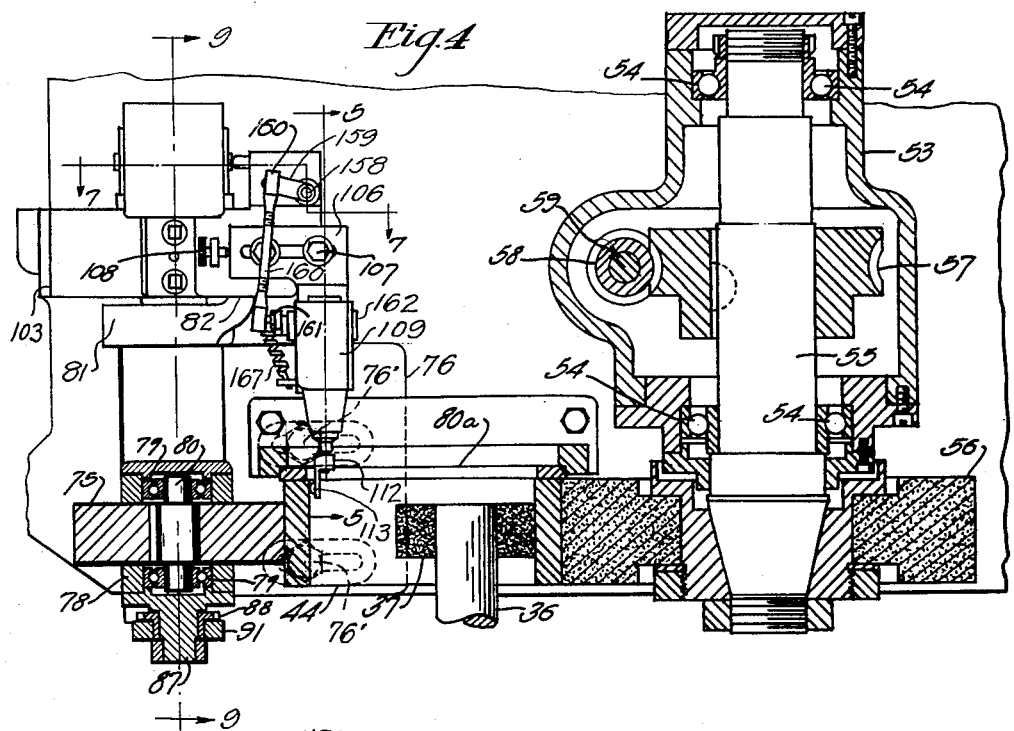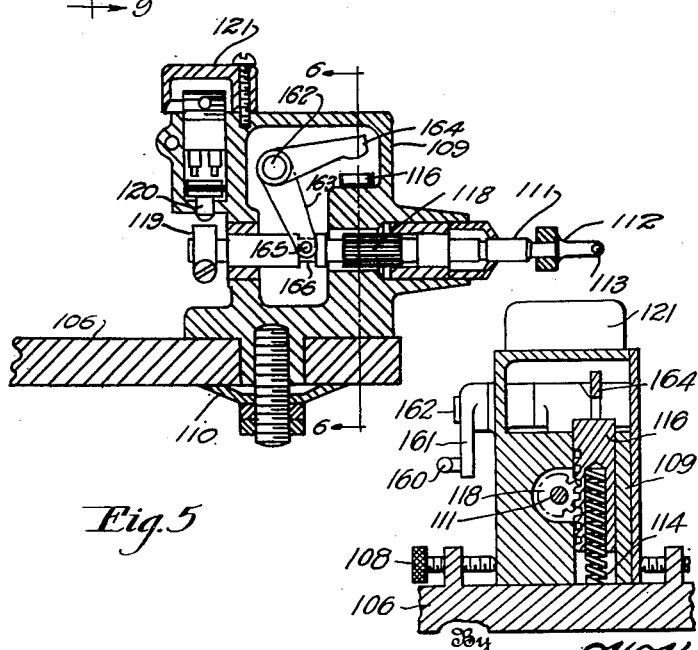

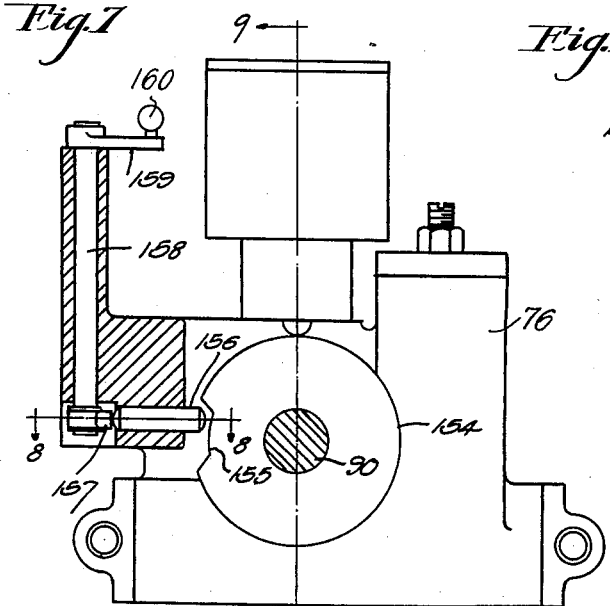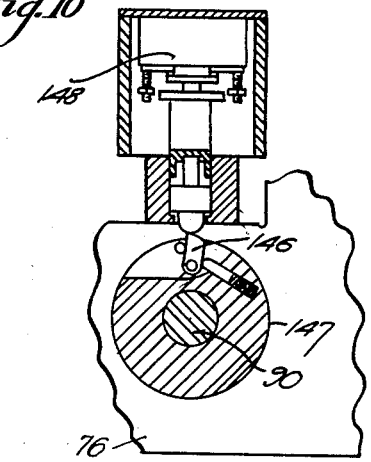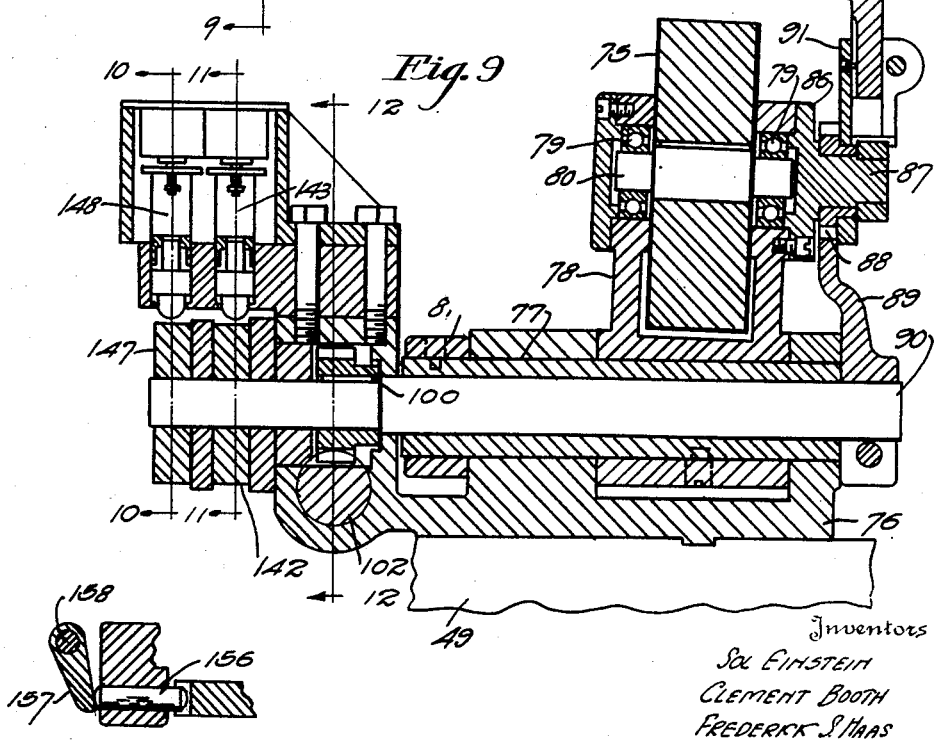

Feb. 25, 1936.  S. EINSTEIN ET AL  2,032,269
GRINDING MACHINE
Original Filed June 28, 1929    11 Sheets-Sheet 6

Inventors
SOL EINSTEIN
CLEMENT BOOTH
FREDERICK S. HAAS
By AHParsons
Attorney

Feb. 25, 1936.   S. EINSTEIN ET AL   2,032,269
GRINDING MACHINE
Original Filed June 28, 1929   11 Sheets-Sheet 7
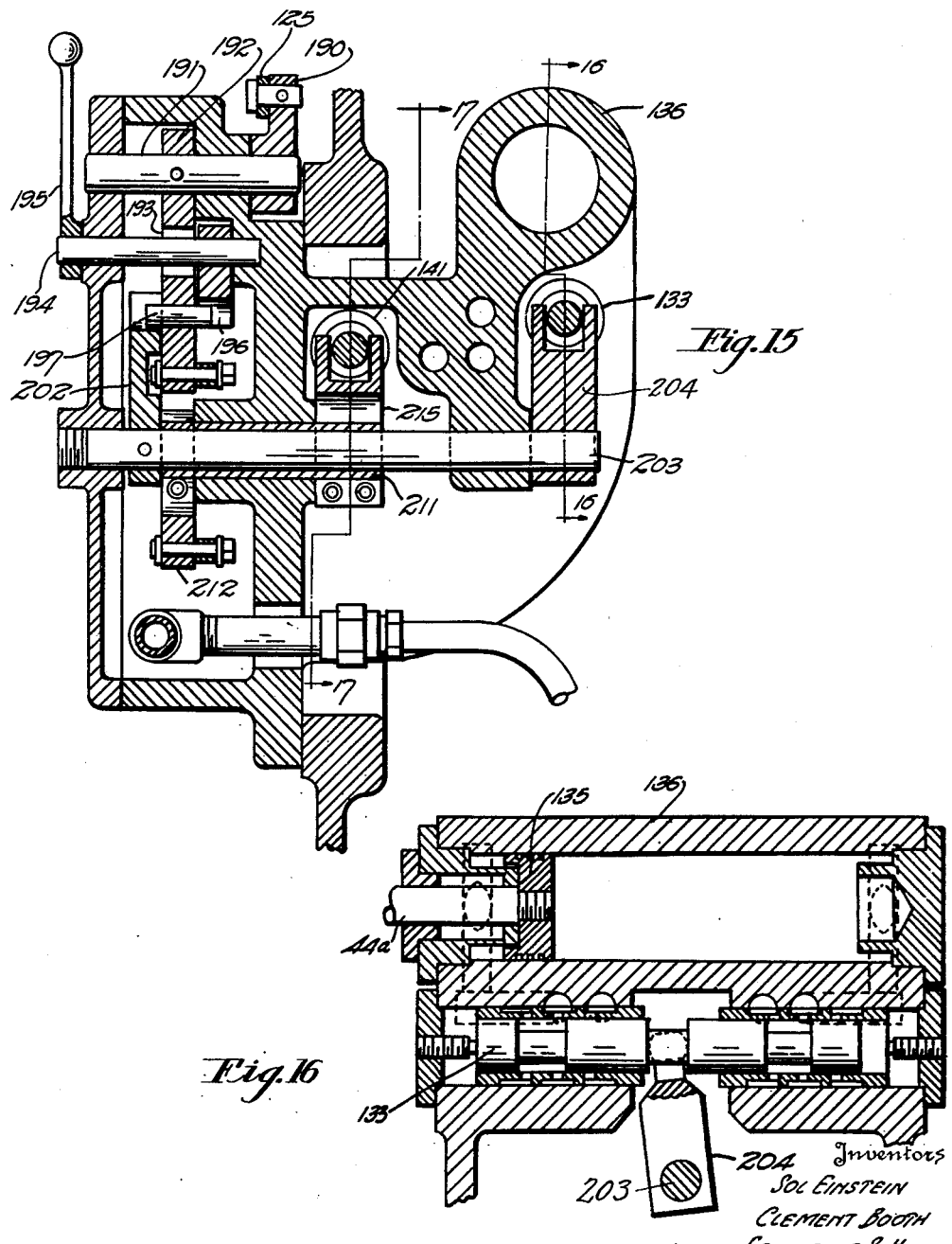

Feb. 25, 1936.  S. EINSTEIN ET AL  2,032,269
GRINDING MACHINE
Original Filed June 28, 1929   11 Sheets-Sheet 8

Inventors
SOL EINSTEIN
CLEMENT BOOTH
FREDERICK S. HAAS
By H. H. Parsons
Attorney

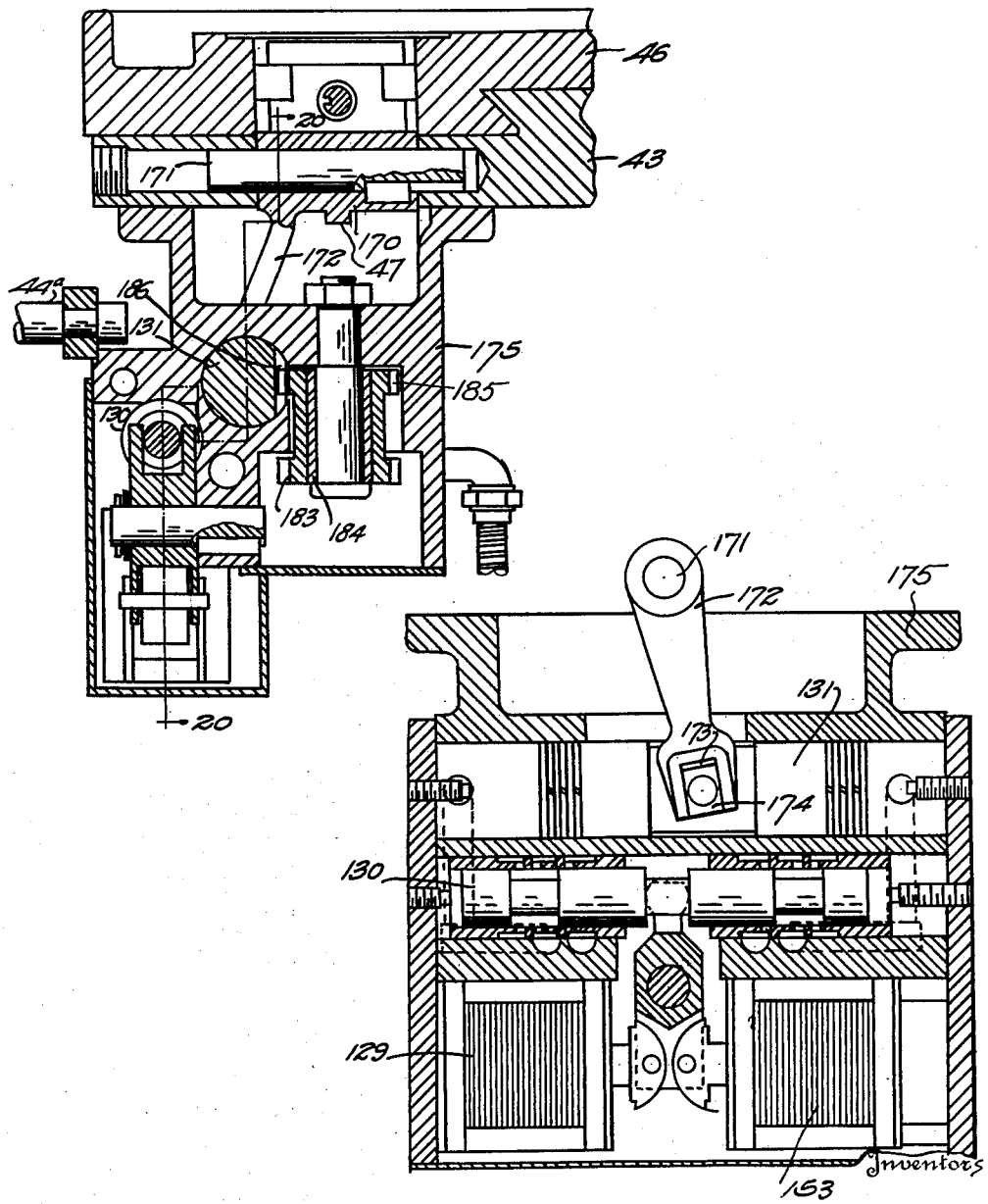

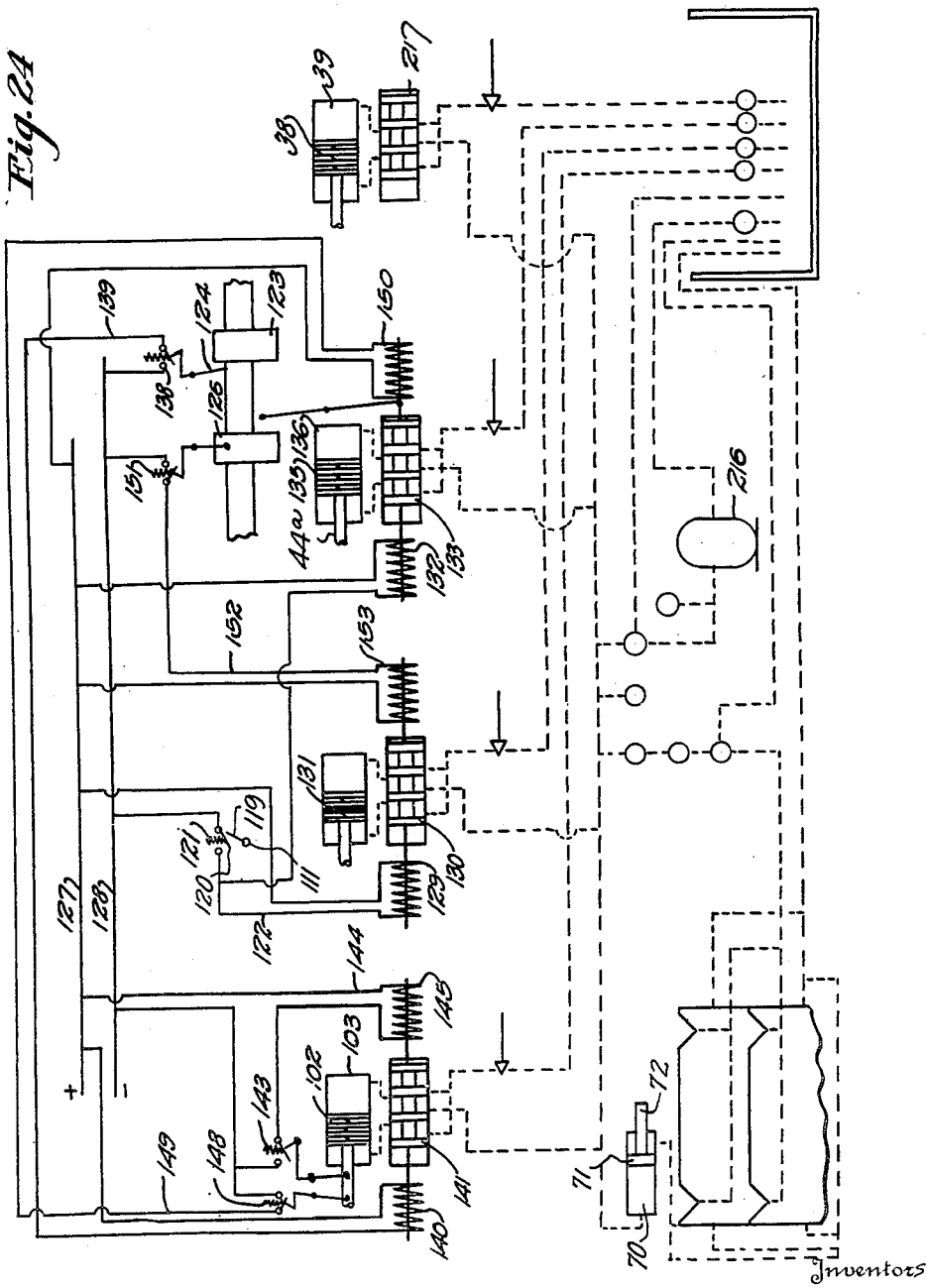

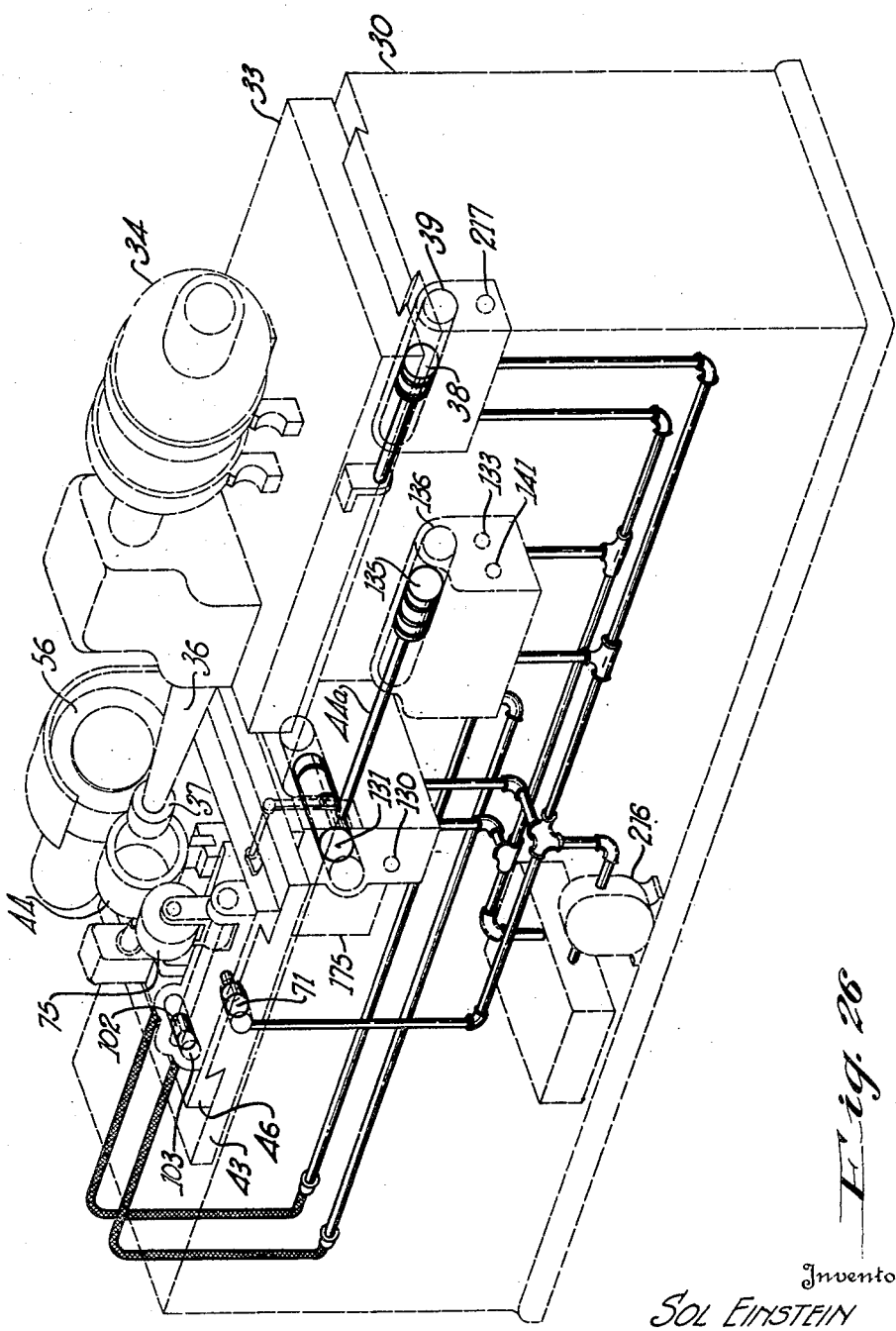

Patented Feb. 25, 1936

2,032,269

UNITED STATES PATENT OFFICE 2,032,269

GRINDING MACHINE

Sol Einstein, Clement Booth, and Frederick S. Haas, Cincinnati, Ohio, assignors, by mesne assignments, to The Heald Machine Company, Worcester, Mass., a corporation of Massachusetts Application June 28, 1929, Serial No. 374,556
Renewed October 25, 1932

20 Claims. (Cl. 51—48)

In the commercial generation of internal surfaces in the past it has been customary to position the work piece by suitable clamps, chucks or other members definitely engaging prescribed portions of the exterior of a work piece to hold the work in position during grinding.

The grinding has then been effected either by a rotation of the chuck or fixture in which the work is mounted or by imparting a planetary movement to the grinding member itself. In either event errors as to size, concentricity and the like would occur and the production delays in this respect have necessarily been large as respects the limits of accuracy prescribed in through grinding due to the fact that accuracy of the final product has been dependent entirely upon the relationship of the various parts of the machine and any play in bearings, inaccuracy of engagement of the work positioning members and the like has been either reproduced or magnified in the finished product.

Furthermore, it has been hitherto found impossible, in prior art machines, to replace a ground work piece in the same position in which it was previously held, in the event that it was desired to perform a further grinding operation thereon (as when the work piece is undersize), and similarly it has been impossible to transfer work satisfactorily from one machine to another for the performance of subsequent grinding operations such as roughing and finishing, due to the inability to reinsert the work in the same or a similar machine in the position previously occupied with the axis of the surface being ground concentric to its axis of rotation, so that the grinding could be correspondingly continued.

As a result of these difficulties, prior art internal grinding machines have necessarily been, in general, a compromise between roughing and finishing machines, since both operations had to be performed by the same machine and same grinding wheel. The customary practice has been to retrue the wheel between these two types of operation so that one or more trueings and consequent loss of grinding time were required in connection with every work piece.

It is an object of the present invention to eliminate these difficulties experienced with prior art mechanisms and to provide a machine of maximum accuracy in the production or generation of interior surfaces on a work piece.

A further object of the present invention is the provision of a machine in which the manner of supporting the work piece will make it possible at any time to remove the work piece and reinsert it in the same or a similar machine in the exact corresponding position which it previously occupied, so that additional grinding or polishing operations may be subsequently performed in either the same or a different machine by the use of a proper grade of grinding wheel for that particular operation.

A further object of the invention is the provision of an improved grinder for the generation of internal surfaces on tubular or like work pieces which shall be automatic in operation and which will reduce to a minimum the non-grinding time per production hour.

A further object of the invention is the provision of a machine of universal adaptability which will produce an internal surface concentric to the finest degree of measurement with a preformed outer surface of the work and which may be quickly and easily adjusted to generate either cylindrical surfaces, tapered or conical surfaces, or other surfaces of revolution, as may be desired.

Further objects of the invention include the provision of novel control mechanism for the automatic functioning of the machine, the determination and control of size of the finished article and improvement in the several structural features of grinding or the like automatic machine details as will be readily apparent by reference to the following detailed description considered in conjunction with the accompanying drawings, and it will be understood that we may make any modification in the specific structural details hereinafter disclosed, or in the combination, arrangement or operation of the machine within the scope of the appended claims, without departing from or exceeding the spirit of the invention.

To facilitate an understanding of the invention there has been illustrated in the accompanying drawings one physical embodiment of the generic principles thereof, in which:

Figure 3 is a fragmentary enlarged sectional view along the line 3—3 of Figure 1 illustrating the position of the work piece within the machine and the structure for introducing, supporting and removing such work pieces.

Figure 4 is a transverse sectional view along the line 4—4 of Figure 3.

Figure 5 is a vertical section through the size determining mechanism along the line 5—5 of Figure 4.

Figure 6 is a vertical section along the line 6—6 of Figure 5.

Figure 7 is a section along the line 7—7 of Figure 4, illustrating a portion of the control mechanism for the work size determinator.

Figure 8 is a fragmentary section along the line 8—8 of Figure 7.

Figure 9 is a vertical section through the ejecting mechanism and associated parts along the lines 9—9 of Figure 4 and Figure 7.

Figure 10 is a section through one of the control mechanisms along the line 10—10 of Figure 9.

Figure 11 is a similar sectional view along the line 11—11 of Figure 9.

Figure 12 is a section through the ejector shaft and associate control parts along the line 12—12 of Figure 9.

Figure 15 is a vertical section therethrough, along the lines 15—15 of Figures 1 and 14.

Figure 16 is a section through the hydraulic control valve and associated parts for regulation of the reciprocation of the table along the line 16—16 of Figure 15.

Figure 19 is a vertical section through said mechanism along the line 19—19 of Figure 18.

Figure 20 is a section through the cam actuating cylinder and associated parts along the line 20—20 of Figure 19.

Figure 24 is a diagrammatic view illustrating the several inter-connected electrical and hydraulic mechanisms for complete automatic operation of the machine.

Figure 26 is a perspective view of the entire machine showing the hydraulic control system in solid lines, and the rest of the parts in phantom.

Figure 2:
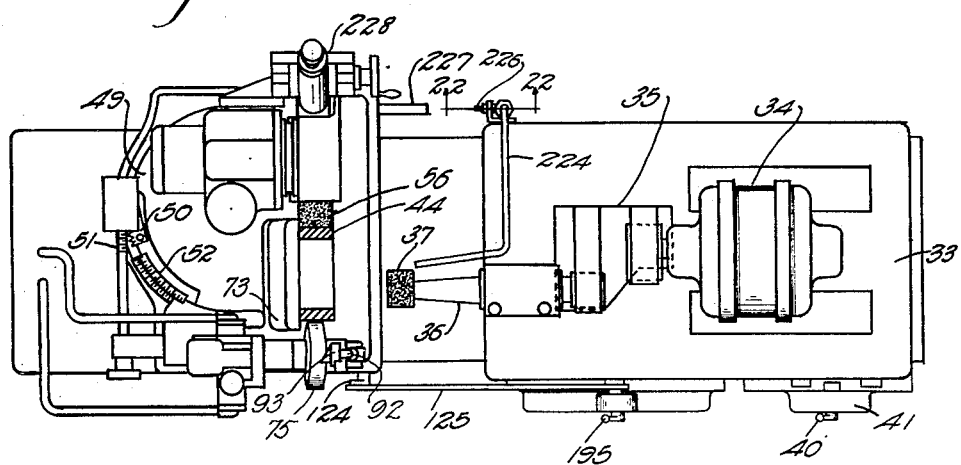
Figure 2 is a plan view thereof.

The general construction and operation of our improved machine will be best understood by reference to Figures 1 to 4, inclusive, of the drawings.

From these it will be noted that in the embodiment here chosen for purposes of illustration, it comprises primarily a main bed 30, having ways 31 at one side and a lower set of ways 32 at the opposite side. Mounted on the ways 31 is the slide or carriage 33 bearing a drive motor 34, and a jack shaft 35 for transmitting power to the grinding wheel spindle 36 provided with a small diameter or internal grinding wheel 37.

The spindle 36 is mounted on carriage 33 for rotation but held against endwise movement. The desired slight reciprocation for the wheel 37 for breaking up grinding lines and traversing said wheel over the surface of the work is imparted to the grinding wheel carriage by a suitable hydraulically actuated piston 38 movable in a cylinder 39 carried by the bed. Reversal of direction of actuation of the piston is effected by reversing lever 40 carried on the front of the grinder control box 41. This lever cooperates with and is actuated by the adjustable dogs 42 mounted on the forward face of the carriage 33. By this construction, a normal reciprocation of an amount predetermined by the adjustment of the dogs is continuously applied to the grinding wheel during actuation of the machine except at such times as lever 40 is manually shifted to an intermediate or neutral position.

Mounted on the ways 32 is the reciprocating table 43 suitably coupled by rod 44a, Fig. 16, with piston 135 movable in a cylinder 136 carried by the bed. This piston is hydraulically operated in its cylinder for moving the table toward or from the grinding wheel.

Figure 1:
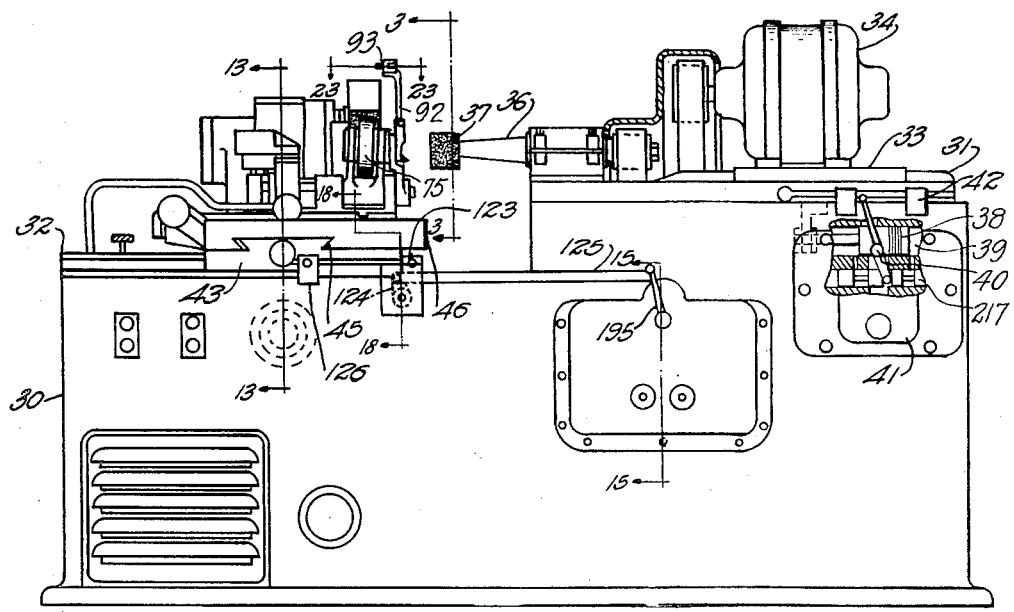
Figure 1 is a front elevation of a machine constructed in accordance with and embodying the principles of the present invention.

The starting, stopping and reversing of the piston and thus of the table is effected by suitably shifting the valve 133, shown in detail in Figure 16, operating in conjunction with certain timing and control mechanism, as hereinafter described, for movement of table 43, and the work supporting and controlling member carried thereby, from disengaged or in operative position (as shown in Figures 1 and 2, for example), to a position in which the grinding wheel 37 will be operatively disposed within the internal bore of a work piece 44, as shown in Figure 4.

In initiating the grinding operation as well as in withdrawing the parts from grinding relation, the grinding wheel is first disposed within the internal bore of the work and then subsequently the work is fed radially into the grinding wheel for desired stock removal to avoid a stock removal effected during the axial movement of the work and wheel into inter-engaged position which imposes an undue amount of work on one edge or portion of the grinding wheel. To facilitate this manner of engagement and relative feeding of grinding wheel, the work table 43 is preferably formed with the dove-tailed guide 45 for the supplemental table or cross-slide 46 which carries the work holding member, and the size determining mechanism.

Figure 18:
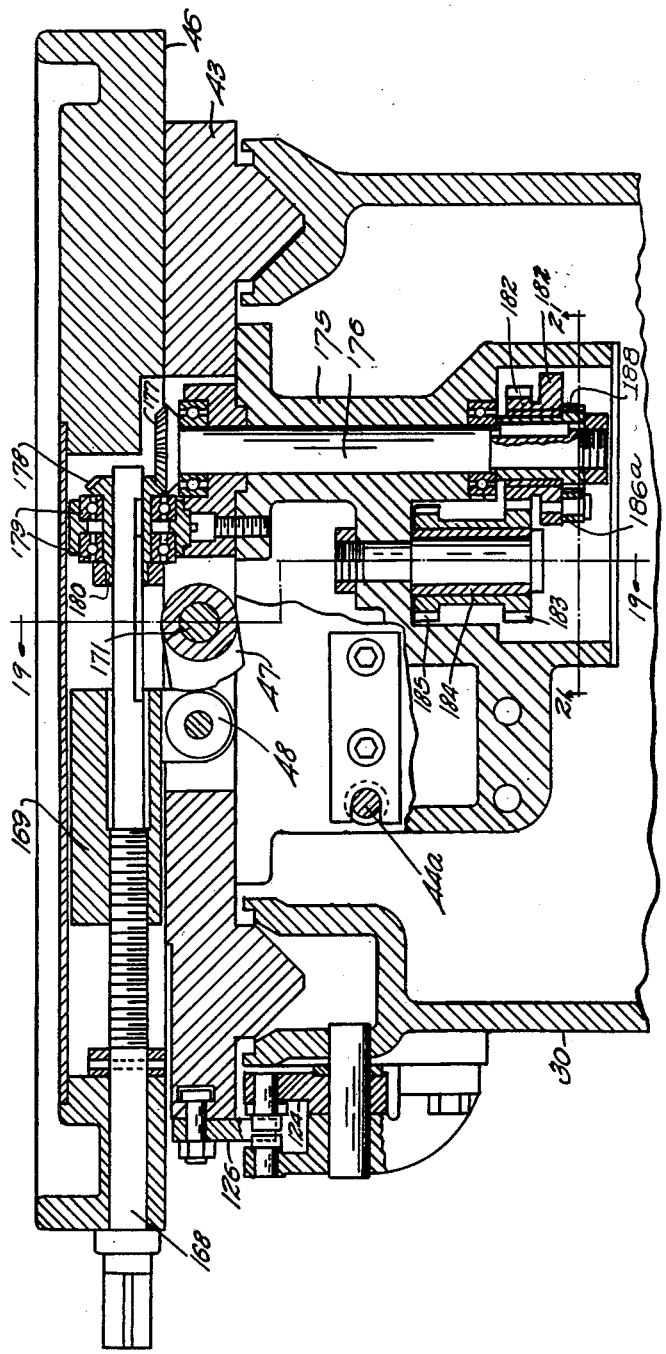
Figure 18 is a transverse section through the bed of the machine along the line 18—18 of Figure 1 illustrating the mechanism for controlling the relative feed of work and grinding wheel.
Figure 21:
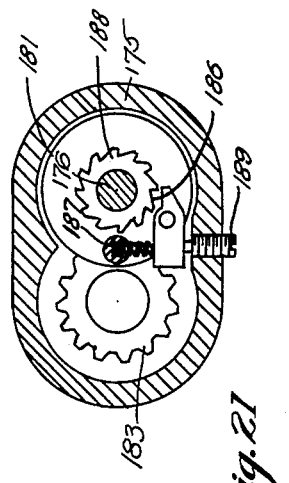
Figure 21 is a fragmentary section of the automatic compensator mechanism along the line 21—21 of Figure 18.

The cross feed movement here required for the grinding operation is normally slight and is attained through the use of a suitably actuated cam 47 carried by the slide 43 and engaging a cam follower 48, best shown in Figure 18.

Figure 13:
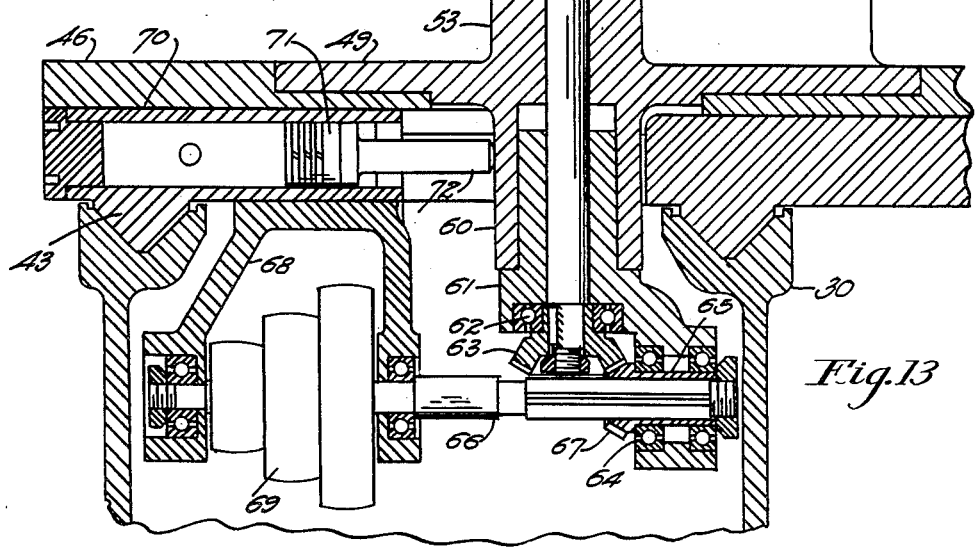
Figure 13 is a vertical section through the regulating wheel drive mechanism along the line 13—13 of Figure 1.

On the supplemental slide 46 is a swivel table 49, Figs. 1 and 13, the latter having the worm rack 50, Fig. 1, engageable by adjusting screw 51 by which the supplemental table is set at any desired angle to the ways 31 and 32.

A micrometer scale 52 facilitates determination of the angle of adjustment of the swivel table 49. The swivel table 49 has the bracket 53, Fig. 4, containing suitable anti-friction bearings 54 for the regulating wheel spindle 55 which supports a regulating wheel 56 preferably constructed of suitable abrasive or frictional material, said wheel engaging the external surface of the work piece 44 and by its rotation controlling the rate of rotation of said work piece. Power to rotate the regulating wheel spindle and regulating wheel at a slow rate of speed is applied to worm gear 57 on the spindle by a worm 58 on a vertical shaft 59 journaled in the lower portion of the bearing bracket 53.

The bracket 53 is further provided with a depending annular flange 60, Fig. 13, in which is rotatably mounted the bushing 61 having a thrust bearing 62 backing up the bevel pinion 63 on the lower end of the shaft 59. This bushing further carries a bearing 64 for sleeve 65 which is splined on drive-shaft 66 and has a bevel pinion 67 meshing with pinion 63. Drive shaft 66 is primarily journaled in the bearing bracket 68 on the under side of the table 43 and is provided with the stepped pulley 69 for suitable application of driving power thereto. By this construction, it will be noted that the swivel table 49 may be inclined as des'red without affecting the drive to the regulating wheel, and, at the same time, slide 46 may be given its desired back and forth movement with flange 60 operating in a suitable slot in the bed, with the bushing 65 and its drive pinion 67 moving freely lengthwise of the splined portion of shaft 66. Suitable mechanism may be employed for shifting the slide 46 and parts carried thereby in a rearward or retracted direction, said mechanism, as shown in the present instance, comprising a cylinder 70 secured to or formed in table 43 and containing a piston 71 having integral therewith a stud 72 bearing against the dependent flange 60. This piston is intended to be suitably hydraulically actuated for rearward shifting of the cross-slide while permitting of free rotation of the swivel table. The hydraulic pressure or volumetric urge in the cylinder 70 is of such nature as to yield and permit of forward movement of the cross-slide under the urge of actuating cam 47 previously referred to.

Disposed on the swivel table 49, in suitable relation to the regulating wheel, is a work rest bracket 73, Fig. 3, bearing a work rest blade 74. In normal operation of the machine, bracket 73 is so adjusted with respect to the regulating wheel 56 as to be spaced therefrom an amount greater than half the diameter of the work piece 44 to be operated upon and the blade itself is provided with an angled top.

This arrangement of parts provides a trough having two points of contact with the periphery of the work piece, to engage and support said work piece properly for operation of the grinding wheel thereon. That the work may be best supported and retained within this trough, use may be made of a friction pressure roll 75 disposed to urge the work toward the regulating wheel and downwardly in the supporting trough, as indicated in Figure 3 of the drawings.

The structural details of this pressure roll unit are particularly illustrated in Figure 9 of the drawings, from which it will be noted that a bracket 76 is adjustably secured on the swivel table 49 by the bolts 76', Fig. 4. This bracket has bearings for the bushing 77 on which is secured the yoke 78 provided with anti-friction bearings 79 for the spindle 80 of pressure roll 75. The pressure roll, it will be noted, has its axis permanently disposed at an angle to the horizontal or general plane of the machine.

In the normal operation of the machine, the regulating wheel is rotated in a counter-clockwise direction, as viewed in Figure 3, showing a face view of the regulating wheel. As so rotated, its outer friction surface engages the outer surface of work piece 44, the two being geared together to rotate in unison, with the work moving in a clockwise direction or with its front surface moving upwardly. Pressure roll 75 is mounted for free rotation on the bearings 79, holding the work firmly against the regulating wheel while, at the same time, the angular disposition of this pressure roll causes it to exert an axial component or thrust against the work, holding the work in position against the back plate 80a, Fig. 4.

The surface of the pressure roll is preferably covered with leather, rubber or other yieldable material and may be either positively or frictionally rotated while in engagement with the work piece when the latter is in position within the throat to hold same in position on the work rest and in driving engagement with the regulating wheel.

As illustrated, sleeve 77 is provided with a collar 81, Fig. 9, having a projecting arm 82, Figs. 4 and 12, which extends into a cylindrical passage 83 of bracket 84 where it is engaged by spring-pressed plunger 85, the latter serving to actuate the arm downwardly and thus rock sleeve 77 to urge the pressure roll inwardly against the work.

The yoke 78, in addition to supporting the pressure roll, is provided with a bearing cup plate 86, Fig. 9, having a stud 87 loosely supporting the pinion 88 which meshes with an actuating rack segment 89 secured on rock shaft 90, the latter extending through sleeve 77. The pinion 88 has an arm 91 coupled with an oscillatory ejector arm 92 for rocking movement of said arm in response to rotation of said pinion.

Figure 23:
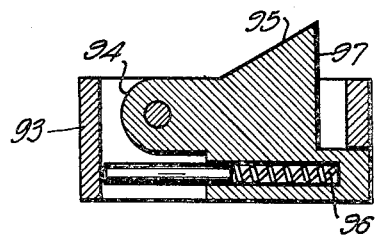
Figure 23 is a detail section of the ejector dog along the line 23—23 of Figure 1.

Arm 92 terminates in a head 93, having pivoted therein the dog or finger 94 (see Fig. 23) provided with an inclined or cam surface 95, permitting same to snap down past the work. Spring 96 forces said dog outwardly after it has passed the upper edge of the work during downward and inward swinging movement of said ejector arm 92, causing shoulder 97 of the dog to engage the inner face of the work piece. On the upward and outward movement of said arm, the dog 94 will consequently lift the work up out of the space between the regulating wheel and pressure roll and discharge same from the machine. During the upward swinging movement around the roll 75, said work piece will engage a latch member or detent 98 of the work piece 44 to release an unground piece of work from the chute or hopper 99, Fig. 3, and this latter unground work piece will be caused by gravity to drop into a position on work rest 74 for subsequent grinding. The swinging movement of the ejector is controlled by a pinion 100, Fig. 12, secured on shaft 90 and meshing with the rack portion 101 of piston 102 movable in cylinder 103 formed in the lower portion of bracket 84. As the piston is moved toward the right, as seen in Fig. 12, a ball 104 will be raised from a groove 105 of the piston 102, said ball bearing against and lifting arm 82 and consequently rocking yoke 78 forwardly or away from the work to release the work from the pressure of roller 75. This movement of the piston, through pinion, 100, also rocks segment 89 forwardly, which, through pinion 88, swings the ejector arm 92 downward. Reverse movement of the piston raises the ejector arm, continuing to a position where ball 104 will again drop into groove 105. The timing of the machine is such that before this occurs the unground work piece will be in operative position, when release of arm 82 permits spring-pressed plunger 85 to function thereagainst, the latter swinging the pressure roll into proper engagement with the unground work piece then in operative position within the machine.

In order that the machine may be fully automatic in operation and may produce work pieces interchangeable as to size, use is made of a suitable size determining mechanism having coupled therewith controls for the discharge of completed work pieces and insertion of unground work pieces. A suitable form of size controlling mechanism is particularly illustrated in Figures 4, 5 and 6 of the drawings. It comprises bracket plate 106, secured to bracket 76, and for in and out adjustment relative thereto, use is made of the bolt and slot connection 107 and micrometer screws 108. Pivoted to this bracket plate is a housing 109, frictionally held in adjusted position as by the nut and spring plate cup structure 110, facilitating minute degrees of variation in position of the housing. This housing has longitudinally journaled therein, the shaft 111 provided with an arm 112 carrying a diamond point or the like 113 (see Fig. 3) for engagement with the inner surface of the work piece. In use, this member is adjusted into such position with respect to the surface of the regulating wheel which exteriorly engages the work that when the inner surface of the work has been ground away a prescribed amount, the point 113 will just ride over the work in an arcuate path tangent to the inner generated surface. At the inception of the grinding operation, shaft 111 is so rocked that the arm 112 and point 113 will be disposed in an upward or above center position, with spring 114 compressed by plunger 116, the latter engaging an elongated pinion 118 on shaft 111. Expansion of the spring tends to move the plunger upwardly, thus rocking shaft 111 to cause the point 113 to swing downwardly past the center of the work, interengagement of the point and surface of the work preventing such swinging movement until the work has been ground down to the desired size.

Shaft 111 is provided with a cam 119, Fig. 5, which serves, on the rotation aforesaid, to lift contact 120 of switch mechanism 121, closing the electrical control circuit 122, Fig. 24, to initiate movement of regulating wheel or work supporting unit rearwardly or away from grinding position, as will hereinafter appear.

This also initiates a movement of the work supporting unit longitudinally of the bed or in an axial direction away from the grinding wheel until grinding wheel and work are disengaged. As the table 43 carrying the work supporting unit is retracted longitudinally of the bed, the adjustable dog 123 thereon contacts with a trip arm 124, which, through link 125, transmits motion to an interengaged series of control levers, solenoid members and the like in the control box of Figures 14 to 17. The series of controls then successively function, as will be pointed out, to actuate the ejector mechanism into the work engaging position previously described, and this movement of the ejector in turn controls electrical circuits for reversely rocking the ejector to withdraw the completed work piece, for mechanically withdrawing the feeler or sizing member from within the work prior to ejection of the work piece, for thereafter restoring said feeler member to a raised position and for reinserting said feeler within the unground work piece. The carriage movement is subsequently automatically reversed to bring the unground work piece into telescoping relation with the grinding wheel. On this reverse movement the second table dog 126 reversely actuates link 125 and the control mechanism coupled therewith, to feed the work piece radially into the grinding wheel, when the prescribed cycle of operation will be repeated.

Figure 25:
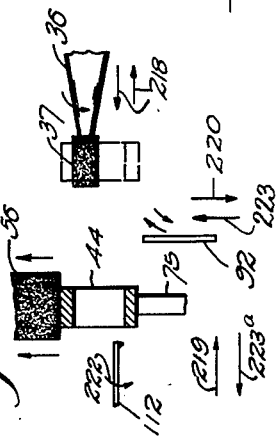
Figure 25 is a diagram indicating by suitable arrows the full directional movement imparted to the respective parts or units of the machine.

The foregoing cycle of operations is diagrammatically illustrated in Figures 24 and 25 of the drawings and will be generally described in conjunction therewith, subsequent reference being made to individual sectional views for the exact mechanical or other structural details of the particular mechanism here illustrated for carrying into effect the results there indicated.

In Figure 24, 127 designates a lead of the general electric circuit and 128 the opposite or return lead thereof. The several electrical circuits have been indicated in full lines together with diagrammatic views of the several hydraulically actuable piston members and control valves therefor, while the hydraulic circuits for actuation of the various mechanical elements of the machine have been indicated by dotted lines.

As above stated, closing of switch or circuit controlling member 120, by oscillation of the sizing feeler, completes the circuit 122 through solenoid 129. This shifts valve 130, actuating piston 131 (see also Fig. 20) to the left. This brings the low portion of cam 47 opposite roller 48, when the constantly existing pressure in cylinder 70 (see Figure 13) will move the supplemental table 46 rearwardly, thereby withdrawing the work piece radially from the grinding wheel. At the same time, member 120 also closes a circuit through solenoid 132, shifting valve 133 to admit pressure to cylinder 136, actuating piston 135 to the left, as shown in Figures 16 and 24, to move the work supporting unit 43 longitudinally into retracted position on the bed. This movement causes table dog 123 to engage and rock the arm 124, thereby closing switch or contact 138 of circuit 139, energizing solenoid 140. This solenoid shifts a valve 141, admitting pressure to actuate piston 102 to the right (see Fig. 12), thus swinging ejector downwardly into engagement with the work piece. As the ejector arm swings downwardly, a cam 142, Fig. 9, on shaft 90 actuates a circuit closer 143 for a circuit 144 through solenoid 145, thereby reversing the valve 141 and thus the direction of movement of the piston 102 and of the ejector arm 92. During the reversing movement of the arm 92, a pawl 146, Fig. 10, carried by a cam 147 on the shaft 90 actuates the circuit completing member 148, thereby closing a circuit 149 through the solenoid 150. The pawl 146 is suitably constructed to prevent actuation of said member 148 by said pawl during the initial counterclockwise movement of the shaft 90. The solenoid 150 then reverses the valve 133 and accordingly the direction of movement of the table controlling piston 135, thereby procuring a longitudinal movement of the table 43 to the right toward the grinding wheel. During this movement, the dog 126 reversely actuates the member 124 to close a contact 151 of a circuit 152 through a solenoid 153. Energization of this solenoid 153 reversely shifts the valve 130 reversing the piston 131 to cause a forward feeding movement of the cross slide 46 to bring the unground work piece radially into engagement with the grinding wheel. The cycle of operation is then repeated and continues as long as power is supplied to the machine and work pieces are supplied to the hopper. The recurrence of the cyclic operation, as will be apparent, is dependent upon the insertion of an unground work piece in the machine to engage and hold in raised position the size determining feeler. The positioning of this feeler is controlled by cam 154, Fig. 7, on shaft 90, said cam having a notched or low point 155 normally receiving the plunger pin 156, whose opposite end contacts with arm 157 on vertical rock shaft 158, the latter carrying at its upper end a rock arm 159 coupled by link 160 with an arm 161, Fig. 4, on shaft 162. As shaft 90 is rocked, under the influence of its controlling piston, cam 154 forces plunger 156 outwardly, rocking shaft 158 and causing a clockwise oscillation of member 162 and the arms 163 and 164, Fig. 5, secured thereto. Arm 163 has a shifter pin 165 riding in groove 166 of the spindle 111, and serves on actuation to retract said spindle and the feeler point carried thereby out of the plane of the work. As this retracting movement is effected, arm 164 is brought down upon plunger 116 to reversely rock the spindle 111. The high point or portion of cam 154 serves to hold the parts in the position just described until the movements of the ejector arm have withdrawn the completed work piece from the work support, and caused an unground work piece to feed down from the hopper. The return movement of the cam allows plunger 156 to ride back into the position shown in Fig. 7, in which the rock arm 159 is released. The link 160 is then returned to original position by a spring 167, thereby rocking the arms 163 and 164 to the position of Fig. 4; return of the arm 163 advances the spindle 111 to reposition the gauging point 113 within the bore of the work piece, and return of the arm 164 releases the plunger 116 to permit expansion of the actuating spring 114, thereby bringing the point into engagement with the internal bore of an unground work piece and urging said point against the surface of the work piece in a direction opposite to the direction of rotation of said work piece. When the parts have been restored to work engaging position, the grinding operation is begun by an axial and radial advance of the work piece into engagement with the grinding wheel, as above pointed out. The grinding wheel itself is continuously rotated and has a slight reciprocating movement imparted thereto, so that it is merely necessary to move the work toward the grinding wheel and suitably feed same inwardly.

Details of the mechanism illustrated for this purpose are shown in Figures 18 to 21 inclusive. Carriage 43 supports the cross-slide 46, in which is swiveled the position adjusting screw 168, which may be suitably, manually actuated from the front of the machine, or automatically actuated by the compensator contained within the bed of the machine. This screw is in threaded engagement with the slidably mounted elongated nut 169 carrying a roller 48, which rides on the surface of cam 47. Cam 47 is secured to or integral with sleeve 170, oscillatably supported in carriage 43 by pin 171. The sleeve has a depending arm 172, Fig. 20, bifurcated as at 173 to engage the block 174 swiveled on reciprocating piston 131. When the solenoid 153 is energized, it shifts valve 130 so that a suitable fluid pressure medium will enter the left-hand end of the cylinder, urging the piston to the right to rock cam 47 to the position shown in Figure 18. In this movement, the cam will tend to press roller 48 and thus the nut 169 forwardly, moving the cross-slide 46 to the left (Fig. 18) or forwardly, causing radial feeding of the work against the grinding wheel. To secure additional feeding movement other than that thus automatically effected, it is merely necessary to rotate screw 168 manually. This forward or feeding movement is in opposition to pressure piston 71, previously referred to, which normally tends to hold the entire unit in a rearward or retracted position.

As the grinding wheel wears down during the operation on successive work pieces, it is necessary to compensate for such wear so that all pieces may be ground to a standard internal diameter. This, of course, may be effected manually but it is preferable that the compensation be cared for automatically and the mechanism for accomplishment of this is particularly illustrated in Figures 18 and 21. Depending from the slide 43 is a bracket member 175 supporting the vertical shaft 176 having at its upper end the bevel gear 177 meshing with a similar gear 178 rotatable in the anti-friction bearings 179 supported by a portion of the slide 43, said gear having a sleeve portion 180 splined on the rear end of screw 168, so that the screw may slide freely therethrough during movement of cross slide 46. Shaft 176 has rotatably mounted on the lower portion thereof a disc 181, having integral therewith a spur gear 182 in permanent mesh with gear 183 of sleeve 184, which has a second gear 185 meshing with the rack 186, Fig. 19, on piston 131.

As the piston reciprocates, the spur gear 183—185 will be rotated, imparting a corresponding rotation to disc 181 loose on the shaft 176. The disc 181 has pivoted thereto a pawl 186a normally urged by a spring 187 into engagement with a ratchet 188 secured to the shaft 176, movement of said pawl tending to rotate the said ratchet and thus the shaft 176 in a counterclockwise direction as the disc 181 rotates in the same direction. During the reverse or clockwise movement of the disc 181, the pawl rides idly over the ratchet without actuating the same.

A knockout screw 189 serves at a given point in the rotation of the disc to engage the outer end of the pawl 186a, moving same away from the ratchet 188 so that shaft 176, when the parts are in retracted position, may rotate freely as the screw 168 is adjusted. As the piston 131 moves rearwardly urging the cross-slide 46 forward, disc 181 will be rotated in a clockwise direction. A greater or less amount of rotation will be given the disc 181, depending upon the distance which the piston 131 travels in urging the cross-slide 46 forward, before a sufficient amount of stock, as determined by the feeler, has been removed from the work piece. During this movement, pawl 186a will be shifted away from the knockout screw 189 and will start to ride over the teeth of ratchet 188. If but a slight movement is given to the disc, the pawl will contact with the ratchet tooth and ride along the face thereof without slipping down behind one of the teeth and will consequently move back to initial position without actuation of the ratchet.

On the other hand, if the grinding wheel has worn down to an extent requiring a relatively large movement of the piston and consequentially a relatively large rotation of the disc bearing the pawl 186a, the reverse movement of cross slide 46 then will cause the pawl to interengage with the ratchet and on return movement, will slightly rotate said ratchet.

This movement is transmitted through shaft 176 and the intermeshing bevel gears 177 and 178 to screw 168, slightly turning this screw in nut 169 to compensate for the wear which has taken place on the grinding wheel. In this manner, an entirely mechanical, automatically operated mechanism is provided in which the movement of the cross slide control cam is automatically effective to compensate for wheel wear so that the machine can run indefinitely without the necessity for manual adjustment and yet with the desired size of work pieces attained and the necessary movements of the cross-slide secured by a non-adjustable or constant throw cam member.

The main control unit of the work supporting unit of the machine has been illustrated in Figures 14 to 17 inclusive. This unit includes the cylinder 136 for the table controlling piston 135, the control valve therefor, the control valve for the work ejector unit and inter-connected mechanisms for mechanically and electrically shifting the valves in question, as well as certain additional related electrical control units.

Link 125 on the front of the machine is pivoted to rock arm 190 (see Fig. 15) of the control unit, which is secured to rock shaft 191 to which is secured the shifter 192, the latter having an enlarged aperture 193 surrounding shaft 194 of the manual control lever 195. This lever has a depending furcated yoke member 196 engaging pin 197 carried by shifter 192. It will thus be seen that member 192 may be moved through actuation of link 125 on arm 190 or by action of yoke 196 on pin 197 as manually effected by rocking of handle 195.

Figure 14:
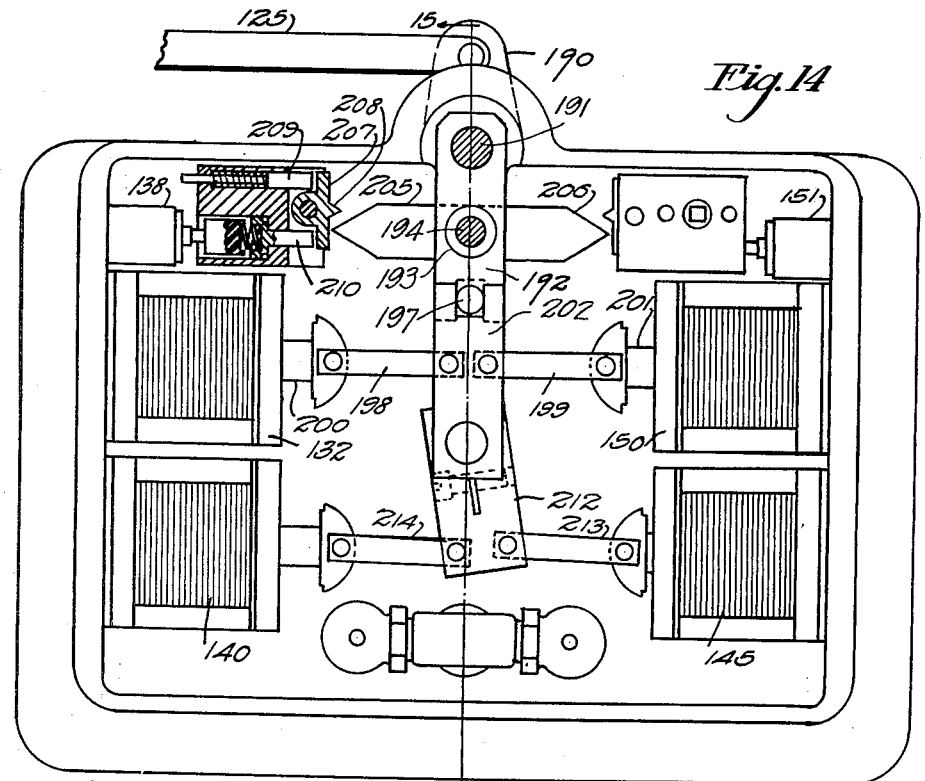
Figure 14 is a front view of the electrical circuit control mechanism with the cover plate therefor removed.
Figure 17:
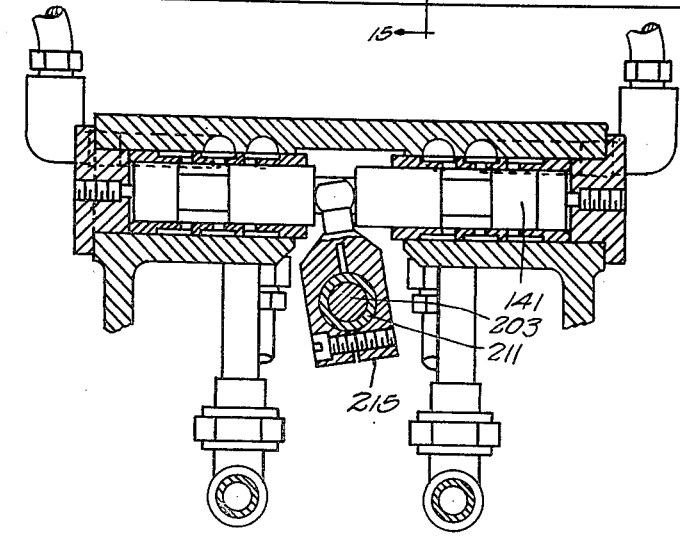
Figure 17 is a similar section of the ejector control valve along the line 17—17 of Figure 15.

In addition, there is coupled to member 192 a pair of links 198 and 199 respectively secured to cores 200 and 201 of the solenoids 132 and 150 respectively. By this arrangement the lever 195 may be turned to shift the parts from neutral position, as indicated in Figure 14, to actuate the controlling valve (for table 43) and thus move said table in either direction. The table will then move until table dog 123 or 126 contacts with rock arm 124.

Inasmuch as there is no load and fire mechanism connected with the rock arm, its link and associated parts will cause a movement of the parts again into merely neutral position while a reversal of the valve is effected only through actuation of one or the other of the solenoids 132 or 150, above referred to in connection with the description of the general controls of the machine particularly illustrated in Figure 24.

Actuation of either of these solenoids will rock member 192 a sufficient amount to act through pin 197 and rock arm 202 to shift table valve 133, this shifting being effected through a rock shaft 203 and an arm 204 associated therewith, thereby to actuate the table 43 in the selected direction.

The rock yoke 197 is additionally provided with the lateral wings 205 and 206 for actuation of the one way switches 138 and 151.

The mechanism for actuating the switch 138, as shown in Fig. 14, comprises an intermediately pivoted plate 207 having an actuable projection 208 for engagement by the tip of the adjacent wing 205 as it oscillates past the projection in either direction and the interengagement of the parts serves to rock plate 207. On upward movement of the wing the plate 207 idly rocks against spring pressed plunger 209 without affecting the switch. On movement in a reverse direction toward neutral position, however, as the table control valve is moved into neutral position, stopping movement of the table, the oscillation of the plate causes it to contact with the associated switch plunger 210 serving to close switch 138. The wing 206 cooperates with similar mechanism for actuating the switch 151. It will thus be seen that as the table is brought to a stop at one limit of its movement, as automatically effected by the table dogs, the cross feed of the slide will be initiated by closing of the switch 151 to shift the valve 130 which controls the cross feed. At the other limit of movement of the table 43, the ejector arm will be caused to function by the closing of a switch 138 in the manner above pointed out. Loosely mounted on shaft 203 is the sleeve 211 to which is secured at one end a rock arm 212 and at the opposite end a shift yoke 215. The rock arm 212 is coupled by links 213 and 214 with the sliding cores of solenoids 140 and 145, while shift yoke 215 is coupled with the reversing valve 141 of the ejector. This valve is shown in detail in Figure 17 and it will be noted is not designed to have a neutral position and at all times directs the current hydraulic actuating medium into one end or the other in the cylinder 103 for piston 102 controlling the ejector.

As the table is brought to a stop in its rearward movement, switch 138 functions energizing solenoid 140, while on rotation of the ejector, a contact is completed through switch 143 energizing solenoid 145 to reverse the valve and cause the ejector to lift out and withdraw the finished work piece, the pressure in the cylinder 103 positively holding the ejector in raised or inoperative position until the valve therefor is again reversed.

The cycle of operation

That the complete automatic functioning of the machine may be best understood, reference is made to Figure 25 of the drawings, graphically illustrating the movement of the machine, considered in conjunction with Figure 24, diagrammatically illustrating the complete electrical and hydraulic circuits as hitherto referred to. Power is supplied to the machine in a suitable manner as by an electrical motor for actuation of pump 216, and motor 34 is also suitably energized to impart driving rotation to spindle 36, the pump motor or prime mover being also preferably utilized to drive shaft 66.

Grinding wheel 37 rotates at a high rate of speed in the direction of the arrow shown thereon in Figure 25, while regulating wheel 56 turns at a slow rate of speed in the direction of its arrow. Movement of handle 40, Fig. 1, starts hydraulic oscillation by suitable shifting of valve 217, this reciprocation being continued by action of the dogs 42 on said handle, the movement of the grinding wheel thus being a constant back and forth one, as indicated by the arrows 218 of Figure 25.

Figure 22:
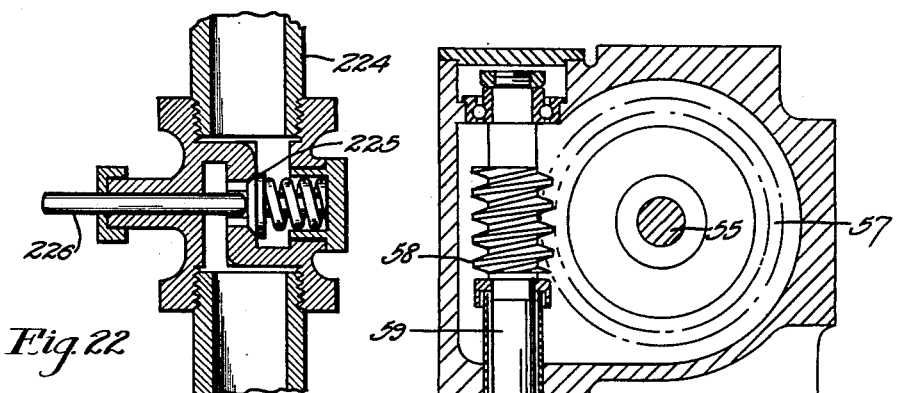
Figure 22 is a fragmentary section through the automatic coolant flow controlling valve along the line 22—22 of Figure 2.

An initial work piece 44 having been placed in position on the machine on work rest 74 and pressed by roller 75 against the regulating wheel 56, rotation is imparted to the work piece by the regulating wheel. Handle 195, Fig. 1, is then shifted to cause movement of the carriage 43 toward the grinding wheel, which movement continues until the grinding wheel is within the bore of the work, when contact of dog 126 with rock arm 124 stops the inward movement of the slide indicated by arrow 219. At this point, switch 151 is closed, causing the complete slide unit, comprising regulating wheel, work rest and pressure roll with size controlling member, to move forward in the direction indicated by arrow 220 until grinding to the prescribed depth has been performed. At this point, sizer 112 rotates, as indicated by arrow 222. At the same time the carriage is rapidly retracted radially in the direction of the reversed arrow 223, and also axially in the direction of the arrow 223a. As the carriage is retracted, the necessary circuits are completed, successively retracting the pressure roller causing a downward and reverse upward swinging of the ejector arm to remove the finished work piece and allow an unground one to move into position on rest 74. The machine is then automatically reversed, to present the succeeding work piece to the action of the grinding wheel, and the above operation is repeated. For most efficient operation, it is desirable that a suitable coolant be supplied to the work during grinding, this being effected through pipe 224, and, to avoid waste of coolant or unnecessary flow during removal of work pieces, a suitable poppet valve such as shown in Figure 22 is utilized, this valve 225 having a stem 226 adapted to contact with an abutment 227 on carriage 43 so that, as the work is moved into position for engagement by the grinding wheel, the valve will be opened to allow a flow of coolant. An axial withdrawal of the work piece from the grinding wheel operates to shut off the supply of coolant by retraction of the abutment 227 from engagement with the valve.

In the foregoing description of the construction and operation of our improved hole generating machine, the advantages thereof should be readily apparent and it will be seen that we have provided an efficient machine in which a work piece, preferably preformed or accurately shaped as to its outer surface, may be readily inserted radially as distinguished from the usual axial introduction of work pieces into the well-known chucks of internal grinding machines. The present machine has a much greater factor of safety to the operator in introduction and removal of work in the above manner. It will further be noted that the work when introduced is in no wise dependent on center chucks or similar holding devices for its position, but that its accurate location within the machine is controlled by the engagement of its preformed external surface with the surface of the regulating wheel 56, which may be trued as by mechanism 228 so that said surface will at all times properly and accurately engage the work. Further support of the work is taken up by the rigid, non-adjusted and non-yielding work rest member. The position of the work is therefore dependent entirely upon its external surface which itself provides a progressive determinator for the location of the work and eliminates the errors previously experienced, due to play in various parts of a machine or inaccuracy of chucks or other gripping members.

It will further be noted that the angular relationship of the pressure roller serves to urge the work positively against the back plate 80, thus retaining it within the machine on the work rest, unaffected by the reciprocation imparted to the grinding wheel. By mounting of the grinding wheel and the drive therefor as a unit upon its own oscillatable slide, a more accurate and more desirable drive therefor is accomplished than has been possible with prior art mechanisms in which the grinding wheel is moved into and out of operative position, the latter movement necessitating a sliding of belts or the like relative to the prime mover or source of rotation therefor, while the confining of the movement of the grinding wheel solely to an axial adjustment for its reciprocation and eliminating any radial adjustment thereof, permits maximum accuracy of position of the grinding member at all times as respects the remainder of the machine.

Furthermore, by the separation of the several prime movements necessary for internal grinding, the high speed grinding spindle may be rigidly mounted and given a slight reciprocation, while the work supporting unit which is more slowly rotated may be quickly moved into operative relation to the grinding wheel. By this construction, the vibration of the work is reduced to a minimum and by the slight necessary feeding movement in the direction of the grinding wheel, a most accurate operative relationship of the parts and thus an increased accuracy of the finished product is assured.

The foregoing are of marked utility for grinding, irrespective of the manner in which the work may be introduced, but the construction in question also particularly lends itself to an automatic introduction of the work such as here described in which, by reason of the radial introduction as distinguished from previous necessary practice of axial introduction of the work, only a relatively slight separation of work holder and grinding wheel is necessitated, while the automatic mechanism rapidly functions to remove the finished work piece and effect introduction of an unground work piece, thereby reducing the idle or non-grinding time of the machine and permitting of its recurrent or continuous cyclic operation as long as work pieces are supplied to the hopper thereof.

We claim:

1. In a machine for grinding hollow articles, the combination with a supporting member, of a work rest carried thereby for peripheral engagement with the work piece, a regulating member rotatably mounted on the support in opposition to the work rest for peripheral engagement with the work, means for rotating said member at a slow rate of speed to frictionally control the rotation of the work, a pressure roll in opposition to the work rest and regulating member, means for urging the roll into engagement with a work piece, additional means for urging the pressure roll into released position, an ejector, and connections between the ejector and said additional means for actuating the ejector when the work is released.

2. In a machine for grinding hollow articles, the combination with a supporting member, of a work rest carried thereby for peripheral engagement with the work piece, a regulating member rotatably mounted on the support in opposition to the work rest for peripheral engagement with the work, means for rotating said member at a slow rate of speed frictionally to control the rotation of the work, a pressure roll in opposition to the work rest and regulating member, means for urging the roll into engagement with a work piece, additional means for urging the pressure roll into released position, an ejector, connections between the ejector and said additional means for actuating the ejector when the work is released, and an end stop member for the work, the pressure roll having its axis arranged at an angle to the axis of rotation of the work whereby when in engagement therewith it exerts a feed component urging the work against the stop.

3. In a machine for grinding hollow articles the combination with a supporting member, of a work rest carried thereby for peripheral engagement with the work piece, a regulating member rotatably mounted on the support in opposition to the work rest for peripheral engagement with the work, means for rotating said member at a slow rate of speed frictionally to control the rotation of the work, a pressure roll in opposition to the work rest and regulating member, means for urging the roll into engagement with a work piece, additional means for urging the pressure roll into released position, an ejector, connections between the ejector and said additional means for actuating the ejector when the work is released, means for bodily shifting the work supporting unit, an electrical control circuit for said last means, a switch member for the circuit and means rendered effective by movement of the ejector for actuating said switch.

4. An internal grinding machine including a bed, a grinding wheel mounted thereon, hydraulic means for imparting a constant limited reciprocation to the grinding wheel on the bed, mechanical means for controlling said reciprocation, a work holding unit movable longitudinally of the bed for presentation of work in operative relation to the grinding wheel and movable transversely of the bed to feed the work against the grinding wheel, hydraulically actuable means for imparting said longitudinal and transverse feeding movements to the work supporting unit, means on the unit for supporting a work piece, and means for varying the position of said supporting means relative to the unit to vary the presentation of the work to the grinding wheel for a given movement of the unit.

5. In a machine of the nature described the combination with a work supporting carriage having means for peripheral engagement with a work piece to support the same in grinding position while permitting of radial removal therefrom, of a gaging member projectable into engagement with the interior of the work piece for determining the size thereof, an electric circuit, means for closing the circuit on predetermined movement of the gage, means operable by closing of said circuit for retracting the carriage to inoperative position, and additional means rendered operative by said retraction for successively withdrawing the gage from the work piece and ejecting the work piece radially from the supporting mechanism therefor.

6. In a machine of the nature described, the combination with a work supporting carriage having means for peripheral engagement with a work piece to support the same in grinding position while permitting of radial removal therefrom, of a gaging member projectable into engagement with the interior of the work piece for determining the size thereof, an electric circuit, means for closing the circuit on predetermined movement of the gage, means operable by closing of said circuit for retracting the carriage to inoperative position, an ejector, an additional means rendered operative by said retraction for successively withdrawing the gage from the work piece and actuating said ejector for ejecting the work piece from the supporting mechanism therefor, and means rendered effective by movement of the ejector for reversely shifting said ejector and moving the gage into operative relation with a subsequent work piece.

7. In a machine of the nature described the combination with a work supporting carriage having means for peripheral engagement with a work piece to support the same in grinding position while permitting of radial removal therefrom, of a gaging member projectable into engagement with the interior of the work piece for determining the size thereof, an electric circuit, means for closing the circuit on predetermined movement of the gage, means operable by closing of said circuit for retracting the carriage to inoperative position, an ejector, an additional means rendered operative by said retraction for successively withdrawing the gage from the work piece and actuating said ejector for ejecting the work piece from the supporting mechanism therefor, means rendered effective by movement of the ejector for reversely shifting said ejector and moving the gage into operative relation with a subsequent work piece, and for initiating movement of the carriage and work piece into operative grinding position.

8. In a machine of the character described the combination with a bed and a grinding wheel carried thereby, of a work supporting unit mounted on the bed including a work rest and opposed regulating wheel for peripheral engagement with the exterior of the work, means for imparting relative axial movement to the grinding wheel and work supporting unit, means for imparting relative feeding movement to said parts, a gaging device, connections between the gaging device and the feeding mechanism for stopping the feeding when the prescribed grinding has been performed, and control mechanism including a bracket, a bushing journaled in the bracket, a rock shaft journaled in the bushing, a yoke carried by the bushing and slidable therewith, a pressure roller carried by the yoke for exterior engagement with a work piece when in position in engagement with the work rest and regulating wheel, means for urging the roller into engagement with the work, an ejector pivotally supported by the yoke, and means for shifting the yoke to disengage the roller from the work and for shifting the ejector relative to the yoke to remove the work piece from the machine.

9. In a machine of the character described the combination with a bed and a grinding wheel carried thereby, of a work supporting unit mounted on the bed including a work rest and opposed regulating wheel for peripheral engagement with the exterior of the work, means for imparting relative axial movement to the grinding wheel and work supporting mechanism, means for imparting relative feeding movement to said parts, a gaging device, connections between the gaging device and the feeding mechanism for stopping the feeding when the prescribed grinding has been performed, and control mechanism including a bracket, a bushing journaled in the bracket, a rock shaft journaled in the bushing, a yoke carried by the bushing and slidable therewith, a pressure roller carried by the yoke for exterior engagement with a work piece when in position in engagement with the work rest and regulating wheel, means for urging the roller into engagement with the work, an ejector pivotally supported by the yoke, and means for shifting the yoke to disengage the roller from the work and for shifting the ejector relative to the yoke to remove the work piece from the machine, said means including a pinion associated with the ejector and a segment carried by the rock shaft for actuation of the pinion.

10. In a machine of the character described the combination with a bed and grinding wheel carried thereby, of a work supporting unit mounted on the bed including a work rest and opposed regulating wheel for peripheral engagement with the exterior of the work, means for imparting relative axial movement to the grinding wheel and work supporting mechanism, means for imparting relative feeding movement to said parts, a gaging device, connections between the gaging device and the feeding mechanism for stopping the feeding when the prescribed grinding has been performed, and control mechanism including a bracket, a bushing journaled in the bracket, a rock shaft journaled in the bushing, a yoke carried by the bushing and slidable therewith, a pressure roller carried by the yoke for exterior engagement with a work piece when in position in engagement with the work rest and regulating wheel, means for urging the roller into engagement with the work, an ejector pivotally supported by the yoke, means for shifting the yoke to disengage the roller from the work, means for shifting the ejector relative to the yoke to remove the work piece from the machine, and actuating means for oscillating the rock shaft to effect said shifting including a pinion on the shaft, and a shiftable rack for rotating the pinion.

11. In a machine of the character described the combination with a bed and grinding wheel carried thereby, of a work supporting unit mounted on the bed including a work rest and opposed regulating wheel for peripheral engagement with the exterior of the work, means for imparting relative axial movement to the grinding wheel and work supporting mechanism, means for imparting relative feeding movement to said parts, a gaging device, connections between the gaging device and the feeding mechanism for stopping the feeding when the prescribed grinding has been performed, and control mechanism for the work including a bracket, a bushing journaled in the bracket, a rock shaft journaled in the bushing, a yoke carried by the bushing and slidable therewith, a pressure roller carried by the yoke for exterior engagement with a work piece when in position in engagement with the work rest and regulating wheel, means for urging the roller into engagement with the work, an ejector pivotally supported by the yoke, means for shifting the yoke to disengage the roller from the work and for shifting the ejector relative to the yoke to remove the work piece from the machine, means for oscillating the rock shaft including a pinion on the shaft and a shiftable rack for rotating the pinion, a control arm on the bushing, and means associated therewith for shifting of the arm on initial movement of the bushing to disengage the roller from the work prior to operative engagement of the ejector with the work.

12. In a machine of the character described the combination with a bed and a grinding wheel carried thereby, of a work supporting unit mounted on the bed including a work rest and an opposed regulating wheel for peripheral engagement with the exterior of the work, means for imparting relative axial movement to the grinding wheel and work supporting mechanism, means for imparting relative feeding movement to said parts, a gaging device, connections between the gaging device and the feeding mechanism for stopping the feeding when the prescribed grinding has been performed, a control mechanism including a bracket, a bushing journaled in the bracket, a rock shaft journaled in the bushing, a yoke carried by the bushing and slidable therewith, a pressure roller carried by the yoke for exterior engagement with a work piece when in position in engagement with the work rest and regulating wheel, means for urging the roller into engagement with the work, an ejector pivotally supported by the yoke, means for shifting the yoke to disengage the roller from the work and for shifting the ejector relative to the yoke to remove the work piece from the machine, a cam member carried by the rock shaft and connections between the cam and gage for shifting the gage out of work engaging position prior to operation of the ejector.

13. In a machine of the character described the combination with a bed and a grinding wheel carried thereby, of a work supporting unit mounted on the bed including a work rest and an opposed regulating wheel for peripheral engagement with the exterior of the work, means for imparting relative axial movement to the grinding wheel and work supporting mechanism, means for imparting relative feeding movement to said parts, a gaging device, connections between the gaging device and the feeding mechanism for stopping the feeding when the prescribed grinding has been performed, a control mechanism including a bracket, a bushing journaled in the bracket, a rock shaft journaled in the bushing, a yoke carried by the bushing and slidable therewith, a pressure roller carried by the yoke for exterior engagement with a work piece when in position in engagement with the work rest and regulating wheel, means for urging the roller into engagement with the work, an ejector pivotally supported by the yoke, means for shifting the yoke to disengage the roller from the work and for shifting the ejector relative to the yoke to remove the work piece from the machine, a cam member carried by the rock shaft and means actuable by the cam for reversing the direction of movement of the shaft.

14. In a machine of the character described the combination with a bed and a grinding wheel carried thereby, of a work supporting unit mounted on the bed including a work rest and opposed regulating wheel for peripheral engagement with the exterior of the work, means for imparting relative axial movement to the grinding wheel and work supporting mechanism, means for imparting relative feeding movement to said parts, a gaging device, connections between the gaging device and the feeding mechanism for stopping the feeding when the prescribed grinding has been performed, a control mechanism including a bracket, a bushing journaled in the bracket, a rock shaft journaled in the bushing, a yoke carried by the bushing and slidable therewith, a pressure roller carried by the yoke for exterior engagement with a work piece when in position in engagement with the work piece when in position in engagement with the work rest and regulating wheel, means for urging the roller into engagement with the work, an ejector pivotally supported by the yoke, means for shifting the yoke to disengage the roller from the work and for shifting the ejector relative to the yoke to remove the work piece from the machine, a cam carried by the rock shaft and means actuable by movement of the cam for initiating movement of the work holding unit as an entirety.

15. In a grinding machine, a grinding member and a work supporting member, means to procure a relative axial movement between said members to bring said members into operative relation, means to procure a transverse movement of one of said members for a relative radial movement therebetween, a gauge contacting with the surface of a work piece in said work supporting member, means responsive to operation of said gauge to reverse the transverse movement of the member and to procure axial separation of said members, and an ejector for procuring a radial discharge of said work piece from the work-supporting member and operable in response to said axial separation.

16. In a grinding machine, a grinding member and a work supporting member, means to procure a relative axial movement between said members to bring said members into operative relation, means to procure a transverse movement of one of said members for a relative radial movement therebetween, a gauge contacting with the surface of a work piece in said work supporting member, means responsive to operation of said gauge to discontinue the radial movement of the member and to procure axial separation, and an ejector operable in response to said axial separation for removing said work piece radially from the work supporting member.

17. In a grinding machine, a grinding member and a work supporting member, means to procure a relative axial movement between said members to bring said members into operative relation, means to procure a transverse movement of one of said members for a relative radial movement therebetween, a gauge contacting with the surface of a work piece in said work supporting member, means responsive to operation of said gauge to discontinue the radial movement of the member and to procure axial separation, an ejector operable in response to said axial separation for removing said work piece radially from the work supporting member, and means responsive to movement of said ejector to return said work supporting member and said grinding member axially to operative position.

18. In a grinding machine, a grinding member and a work supporting member, means to procure a relative axial movement between said members to bring said members into operative relation, means to procure a transverse movement of one of said members for a relative radial movement therebetween, a gauge contacting with the surface of a work piece in said work supporting member, means responsive to operation of said gauge to discontinue the radial movement of the member and to procure axial separation, an ejector operable in response to said axial separation for removing said work piece radially from the work supporting member, means responsive to movement of said ejector to position an unground work piece in the work supporting member, and other means responsive to movement of said ejector to return the work supporting member and the grinding member axially to operative position.

19. In an internal grinding machine, a base, a grinding member, a centerless work-supporting member comprising spaced supporting elements engageable with the periphery of a workpiece, one of said elements by its rotation procuring a rotation of the workpiece, means for procuring a relative axial movement between said members, means for procuring a relative crossfeed movement between said members for a grinding operation on a workpiece in the work-supporting member, means under the control of the grinding operation for procuring an axial separation of the members, an ejector, means responsive to said axial separation for actuating said ejector to procure a radial discharge of the workpiece from the work-supporting member, one of said work-supporting elements being movable relative to the others for release of said workpiece before ejection, and means responsive to movement of said ejector for procuring a return of the members axially into operative position.

20. In an internal grinding machine, a base, a grinding member supported thereby, a work-supporting member comprising spaced elements engageable with the periphery of a workpiece, one of said elements being rotatable for procuring a rotation of the workpiece, means for procuring a relative axial movement between said members for positioning the grinding member within the bore of the workpiece, means responsive to the axial shifting movement for procuring a crossfeed movement between said members, means under the control of the grinding operation for procuring a retraction of the crossfeed movement and an axial withdrawal movement between said members, an ejector, means responsive to the axial withdrawal movement for procuring a radial discharge of the workpiece from the work-supporting member, one of the work-engaging elements being removable relative to the others for releasing of the workpiece before ejection, and means responsive to the movement of the ejector for procuring a return of the members axially into operative position.

SOL EINSTEIN.
CLEMENT BOOTH.
FREDERICK S. HAAS.

CERTIFICATE OF CORRECTION.

Patent No. 2,032,269. February 25, 1936.

SOL EINSTEIN, ET AL.

It is hereby certified that error appears in the printed specification of the above numbered patent requiring correction as follows: Page 2, second column, line 30, for the words "in operative" read inoperative; page 3, second column, line 43, beginning with the word "During" strike out all to and including the word "grinding" in line 50, and insert instead the words During the upward swinging movement of the work piece 44 around the roll 75, said work piece will engage a latch member or detent 98, Fig. 3, to release an unground piece of work from the chute or hopper 99, and this latter unground workpiece will be caused by gravity to drop into a position on work rest 74 for subsequent grinding; page 6, first column, line 33, strike out the parentheses around the words "for table 43"; page 8, first column, strike out lines 11 to 27 inclusive, comprising claim 4; and for the claim numbers "5, 6, 7, 8, 9, 10, 11, 12, 13, 14, 15, 16, 17, 18, 19 and 20," read 4, 5, 6, 7, 8, 9, 10, 11, 12, 13, 14, 15, 16, 17, 18 and 19, respectively; and that the said Letters Patent should be read with these corrections therein that the same may conform to the record of the case in the Patent Office.

Signed and sealed this 5th day of May, A. D. 1936.

(Seal)

Leslie Frazer
Acting Commissioner of Patents.